United States Patent
Espinal et al.

(10) Patent No.: US 10,058,918 B2
(45) Date of Patent: *Aug. 28, 2018

(54) SURFACE TREATMENT OF POWERS

(71) Applicant: United Technologies Corporation, Hartford, CT (US)

(72) Inventors: Anais Espinal, West Hartford, CT (US); Georgios S. Zafiris, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 508 days.

This patent is subject to a terminal disclaimer.

(21) Appl. No.: 14/697,853

(22) Filed: Apr. 28, 2015

(65) Prior Publication Data

US 2015/0321253 A1 Nov. 12, 2015

Related U.S. Application Data

(60) Provisional application No. 61/990,954, filed on May 9, 2014.

(51) Int. Cl.
| | | |
|---|---|---|
| *B22F 1/00* | (2006.01) |
| *B05C 9/10* | (2006.01) |
| *B05C 11/10* | (2006.01) |
| *C09C 1/62* | (2006.01) |
| *C09C 1/64* | (2006.01) |

(Continued)

(52) U.S. Cl.
CPC .............. *B22F 1/0062* (2013.01); *B05C 9/10* (2013.01); *B05C 11/10* (2013.01); *C09C 1/62* (2013.01); *C09C 1/644* (2013.01); *C09C 3/12* (2013.01); *B33Y 10/00* (2014.12); *B33Y 40/00* (2014.12)

(58) Field of Classification Search
CPC .... B22F 1/0062; B22F 1/0059; B22F 1/0003; B22F 1/0066; B22F 1/0077; B22F 1/0074; B22F 1/0081; B22F 1/0085; B22F 1/0088; B22F 1/0092; B22F 1/02; B05C 9/10; B05C 11/10; B33Y 10/00; B33Y 40/00; C09C 1/02; C09C 1/627; C09C 1/64; C09C 1/644; C09C 1/648; C09C 3/12

See application file for complete search history.

(56) References Cited

U.S. PATENT DOCUMENTS

| | | | |
|---|---|---|---|
| 5,976,456 A | 11/1999 | Ziani et al. | |
| 6,316,050 B1 * | 11/2001 | Troll | B82Y 30/00 |
| | | | 427/213 |

(Continued)

FOREIGN PATENT DOCUMENTS

| | | |
|---|---|---|
| DE | 2454138 A1 | 5/1975 |
| EP | 0924269 A1 | 6/1999 |

OTHER PUBLICATIONS

European Examination Report, for European Patent Application No. 15167218.5, dated Oct. 28, 2016, 4 pages.

(Continued)

*Primary Examiner* — Colleen P Dunn
*Assistant Examiner* — Anthony M Liang
(74) *Attorney, Agent, or Firm* — Kinney & Lange, P.A.

(57) ABSTRACT

A powder treatment method includes loading powder into a fluidized bed vessel. At least some of the powder is fluidized in the fluidized bed vessel using an inert gas. While fluidized, the powder is heated in the fluidized bed vessel. A surface treatment coating is then applied to the powder.

20 Claims, 3 Drawing Sheets

(51) Int. Cl.
*C09C 3/12* (2006.01)
*B33Y 10/00* (2015.01)
*B33Y 40/00* (2015.01)

(56) References Cited

U.S. PATENT DOCUMENTS

| | | |
|---|---|---|
| 6,811,765 B1 | 11/2004 | Maiwald et al. |
| 7,141,207 B2 | 11/2006 | Jandeska, Jr. et al. |
| 8,470,443 B2 * | 6/2013 | Gottschalk-Gaudig ...................... C09D 7/62 428/405 |
| 2007/0118243 A1 * | 5/2007 | Schroeder .............. B33Y 50/00 700/118 |

OTHER PUBLICATIONS

Extended European Search Report for EP Application No. 15167218.5, dated Sep. 22, 2015, 6 pages.

\* cited by examiner

SURFACE TREATMENT OF POWERS

CROSS-REFERENCE TO RELATED APPLICATION(S)

This application claims the benefit of U.S. Provisional Application No. 61/990,954, filed May 9, 2014 for "SURFACE TREATMENT OF POWDERS" by Anais Espinal and Georgios S. Zafiris.

BACKGROUND

The present invention relates to a surface treatment of powders. In particular, the invention relates to a surface treatment of powders to be used in additive manufacturing processes.

Additive manufacturing is an established but growing technology. In its broadest definition, additive manufacturing is any layerwise construction or articles from thin layers of feed material. Additive manufacturing may involve applying liquid, layer, or particle material to a workstage, then sintering, curing, melting, and/or cutting to create a layer. The process is repeated up to several thousand times to construct the desired field finished component or article.

Often times it is necessary to pre-treat raw powder used in some of the additive manufacturing processes. Pre-treatment may include coating, degassing and heat treating the powder. The powder particles can be coated in order to prevent oxidation of the particles during the additive manufacturing process. For example, U.S. Pat. No. 7,141,207 discloses applying a copper coating to aluminum powder.

Degassing can be used to remove water vapor from the powder particles. Surfaces of the powder can become oxidized very quickly during the manufacturing process when exposed to the environment. Water vapor can absorb into the oxide, which can cause voids in the material formed with the additive manufacturing process. Methods of removing water from the manufactured materials can cause the forming of hydrogen which can make the final material more brittle. Previous methods of removing water vapor from the powder include various methods of degassing. For example, U.S. Pat. No. 5,976,456 describes a degassing method using heating aluminum powder in a vacuum to very high temperatures. However, complications can occur with maintaining a very low pressure vacuum during the degassing.

Additionally, traditional methods of high temperature heat treatment of gases can cause unwanted sintering of the powder. For example, fluidized beds have been used in conjunction with heat treating of powder to prevent agglomeration, as discussed in U.S. Pat. No. 6,811,765.

In particular, cold spray additive manufacturing requires removal of moisture and hydroxides on the surface of aluminum alloys at elevated temperatures to avoid detrimental effects in the final article such as blistering.

SUMMARY

A powder treatment method includes loading powder into a fluidized bed vessel. At least some of the powder is fluidized in the fluidized bed vessel using an inert gas. While fluidized, the powder is heated in the fluidized bed vessel. A surface treatment coating is then applied to the powder.

A powder treatment apparatus includes a fluidized bed vessel. A heat source for introducing heat in to the fluidized bed vessel is included in the powder treatment apparatus. Powder is disposed within the fluidized bed vessel. A surface treatment unit is fluidly connected to the fluidized bed vessel.

A powder treatment method includes loading powder into a fluidized bed vessel. At least some of the powder is fluidized in the fluidized bed vessel using an inert gas. While fluidized, the powder is heated in the fluidized bed vessel. A surface treatment coating is applied to the powder. The surface treatment coating includes a siloxane based coating. The surface treatment coated powder is then used to additively manufacture an article.

DETAILED DESCRIPTION

The powder treatment method for cold-spray additive manufacturing in the present disclosure includes the surface treatment of powder particles to prevent the attachment or reactivity of water molecules, as well as increasing the flowability of the powder surfaces to prevent powder feeder blockages. The disclosed method provides a solution for these issues through the removal of high moisture levels by heat treatment followed by treatment of the powder particles surface with a chemical agent to prevent moisture reabsorption upon exposure to ambient conditions. The disclosed method allows for cost effective powder storage conditions, easier handling, and increased flowability. The disclosed method also provides for the availability of scalable processes to existing powder preparation methods.

An example of a fluidized bed for degassing and heat treating powders is disclosed in U.S. application Ser. No. 61/815,359 (Nardi), which is herein incorporated by reference.

Figure 1:
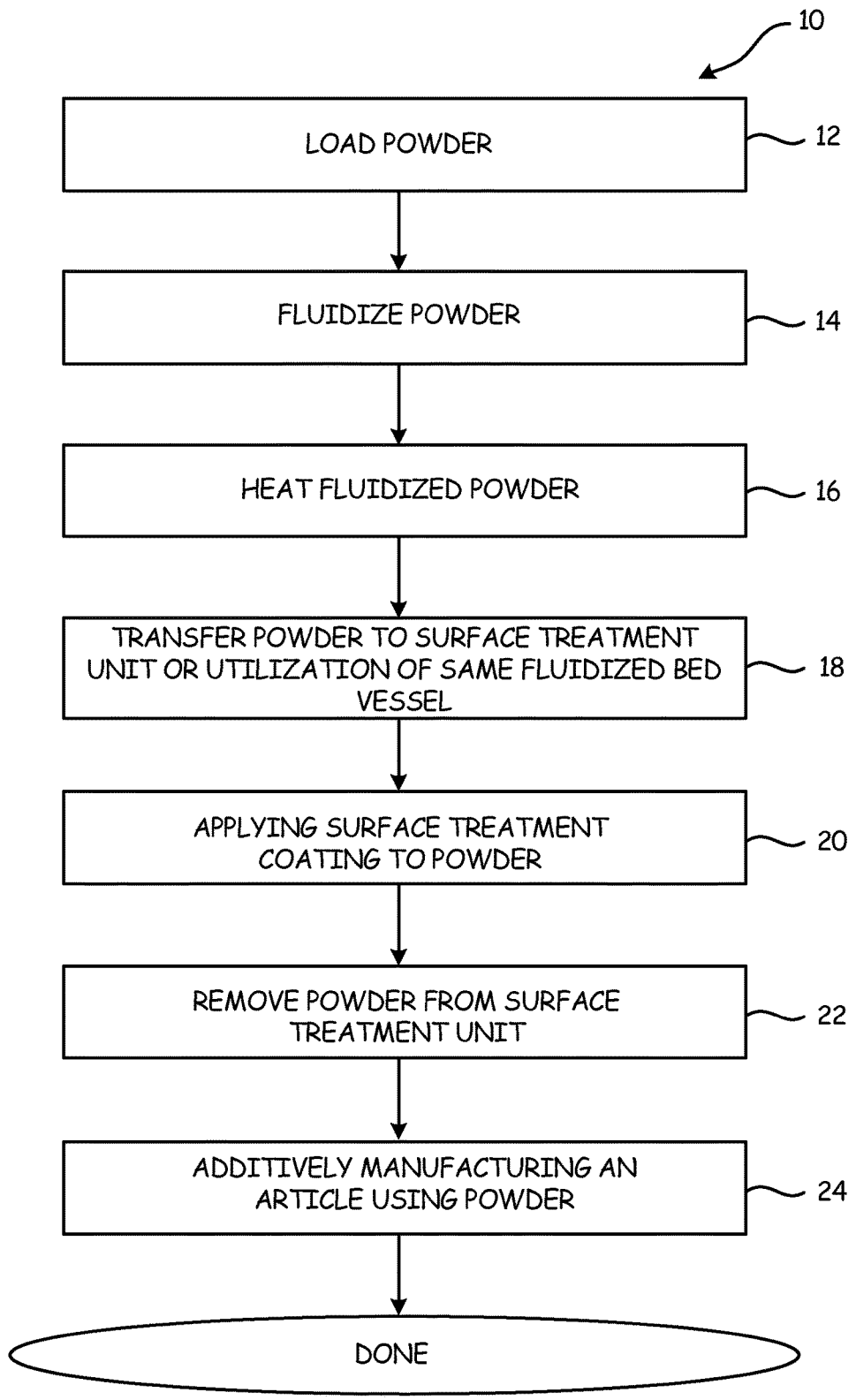
FIG. 1 is a schematic flow chart illustrating a powder treatment method.

FIG. 1 shows a schematic block diagram of powder treatment method 10. Powder treatment method 10 includes a series of steps to prepare powder for use in an additive manufacturing process. In step 12, the powder is loaded into a fluidized bed vessel. Step 14 involves fluidizing at least some of the powder in the fluidized bed vessel. In step 16, the fluidized powder is heated in the fluidized bed vessel. Step 18 involves transferring the powder to a surface treatment unit. Alternatively, the same fluidized bed unit or assembly can be utilized to surface treat the powder. Step 20 includes applying a surface treatment coating to the powder. In step 22, the powder is removed from the surface treatment unit to be stored in a storage container at ambient conditions. Step 24 involves additively manufacturing an article using the surface treatment coated powder.

With regards to step 12, before the powder is loaded into the fluidized bed vessel, the powder may be received with significant amounts of absorbed or reacted moisture. The types of powders used may include metal alloy powders, non-metallic powders, magnetic powders, non-magnetic powders, ceramic powders, glass powders, or polymer powders. In an exemplary case the powder comprises metallic alloys such as aluminum alloys. Additional metallic alloys that can be utilized may include titanium alloys or copper alloys.

After the powder is loaded into the fluidized bed vessel, the powder is fluidized in step 14. Fluidization of the powder occurs as the powder is entrained in a flow of inert gas. The fluidized powder may also be heat treated in step 16 either during the fluidization process or after the powder is fluidized. The range of temperatures and time periods used during the heating process may depend on the powder material. Temperatures used during step 16 for aluminum alloys can range up to 600° C. In general for metallic powders, it is desirable to heat the metallic powder to a temperature lower than its sintering temperature.

Step 20 includes applying a surface treatment coating to the powder particles. The surface treatment coating may be applied to the powder by a surface treatment unit. The coating applied to the powder may be between 1 to 5 nm in thickness. The coatings may be siloxane based, and in particular comprise a polysiloxane coating, a polydimethylsiloxane ("PDMS") coating, a polymethylhydrosiloxane coating and combinations thereof, as well as non-silicone based coatings including stearate salts, stearamides, copolymers of ethyl oxide and propylene oxide, combinations thereof, or other chemistries commonly known to enhance the hydrophobic and/or flowability properties of a powder. Additionally, chemicals that are commonly known to increase electro-static repulsion may be applied to the powder to enhance the flowability of the powder. Applying the surface treatment coating to the powder may include subjecting the powder to an increased temperature for a period of time. Particularly, applying the surface treatment coating to the powder may include vaporizing PDMS and applying the vaporized PDMS to the powder. The surface coating treatment may increase the hydrophobic, flow, and slip properties of the powder so that the powder repels water and contains an increased capacity for flowability. Flowability may include the ability of the powder to flow at a given rate or for the particular powder particles to flow passed one another. A higher flow rate allows for less adhesion between particular powder particles and allows the powder to flow more freely through containers and passages. A low flow rate may be caused by a greater adhesion force between particular powder particles and cause the powder to flow less freely through containers and passages. Other properties affecting flow rate of a powder may include bulk density, friction coefficient, contact angle, permeability, and angle of repose.

Alternatively, the surface treatment coating may be applied while the powder remains in the fluidized bed vessel without transferring the powder to a surface treatment unit before applying a surface treatment coating to the powder.

Coating the powder enables it to be stored in ambient and not tightly controlled and inerted conditions for longer periods of time before being used in an additive manufacturing process.

Step 22 includes removing the surface treatment coated powder from the surface treatment unit and moving it to a storage container. Step 24 includes additively manufacturing an article using the surface treatment coated powder.

In some embodiments, powder treatment method 10 may be used to prepare powder for use in a cold spray deposition additive manufacturing process. In such a process, the powder is not melted such that the microstructure of the powder particle before the deposition process remains the same after a final article is formed. Thus, it becomes advantageous to manipulate the microstructure to a desirable state before the additive manufacturing process begins. In particular, cold spray deposition processes benefit from having powder particles that will deform well and that will bond well. In various embodiments, an inert gas, such as argon, can be used as the fluidizing gas. Simultaneously, the fluidizing gas can be used to clean the powder to facilitate bonding. Thus, in one embodiment, a hydrogen fluidizing gas can be used to remove oxides. In other embodiments, nitrogen gas can be used to prevent the formation of oxidation on the powder.

Powder treatment method 10 may allow for increased prevention of physical and chemical attachment of water on the powder through the manufacturing of hydrophobic layers on the powder. Storage of powders at ambient conditions without the need for a tightly controlled atmosphere is also enabled by powder treatment method 10. Powder treatment method 10 may also eliminate the need of additional process requirements since the removal of the surface treatment or modifying agent can be completed under the conditions currently used in cold-spray processes. Furthermore, a steady stream of powder flow is facilitated by powder treatment method 10 since the particles are prevented from agglomerating, resulting in reproducible and predictable coatings, increased additive manufacturing process control, and higher quality end products. In addition, powder treatment method 10 produces a higher range of utilizable powders for cold-spray and other additive manufacturing methods, and a scalable process through the incorporation of the surface treatment step to an existing fluidized bed vessel.

Figure 2:
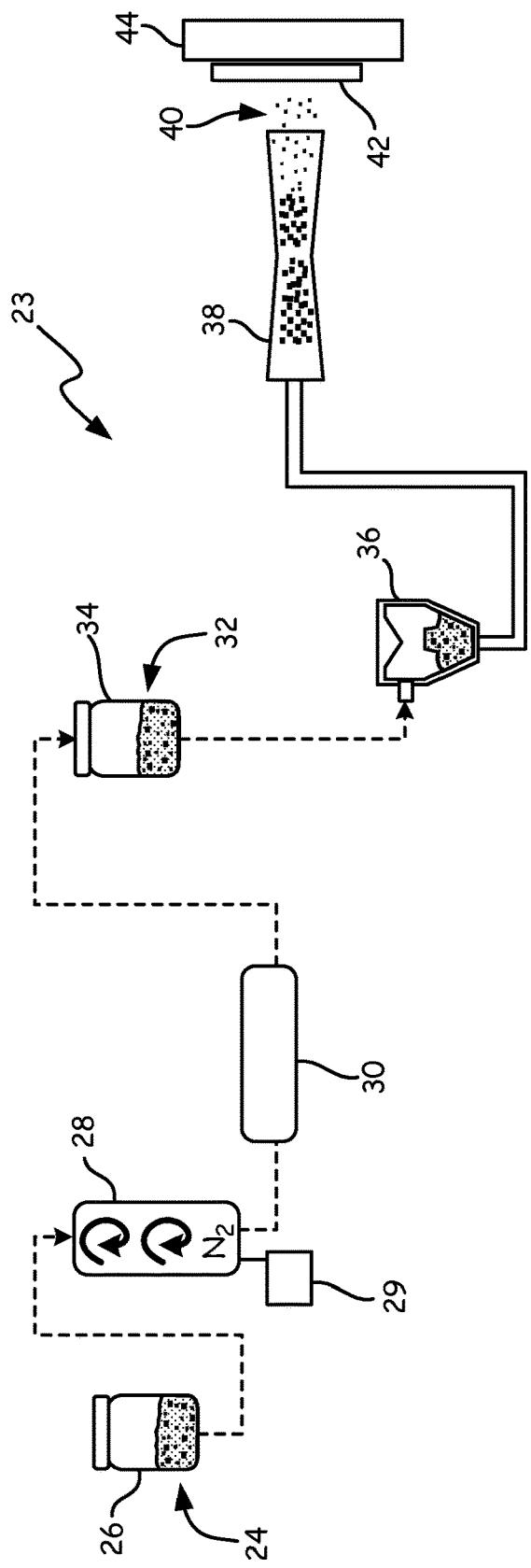
FIG. 2 is a simplified block diagram illustrating a powder treatment method.

FIG. 2 shows a simplified block diagram of first powder treatment apparatus 23. First powder treatment apparatus 23 may include received powder 24, first storage vessel 26, first fluidized bed vessel 28, inert gas heater 29, surface treatment unit 30, surface coated powder 32, second storage vessel 34, powder feeder 36, cold-spray apparatus ultrasonic nozzle 38, sprayed powder 40, substrate 42, and/or spray-platform 44.

Received powder 24 is stored in first storage vessel 26. First storage vessel 26 is fluidly connected to first fluidized bed vessel 28. Surface treatment unit 30 is fluidly connected to first fluidized bed vessel 28. Surface coated powder 32 is located in second storage vessel 34 which is fluidly connected to surface treatment unit 30. Powder feeder 36 is fluidly connected to cold-spray apparatus ultrasonic nozzle 38. Sprayed powder 40 is ejected from cold-spray apparatus ultrasonic nozzle 38. Sprayed powder 40 forms as substrate 42 onto spray-platform 44.

Received powder 24 is transferred from first storage vessel 26 and loaded into first fluidized bed vessel 28, where received powder 24 is fluidized and heat treated by an inert gas stream. After the powder is heat treated it is transferred to surface treatment unit 30.

Surface treatment unit 30 acts to provide the powder with a coating that enhances its hydrophobic and flowability properties as disclosed above. Surface treatment unit 30 may be disposed separately from first fluidized bed vessel 28 (as shown in FIG. 2), or alternatively can be integrated with and/or attached to first fluidized bed vessel 28.

After the surface coated powder 32 is removed from surface treatment unit 30, surface coated powder 32 is placed into second storage vessel 34, which may include an ambient atmosphere due to the increased hydrophobic properties of surface coated powder 32.

Upon initiation of an additive manufacturing process, surface coated powder 32 is placed in powder feeder 36. Powder feeder 36 feeds coated powder 32 to cold-spray apparatus ultrasonic nozzle 38. Cold-spray apparatus ultrasonic nozzle 38 then deposits coated powder 32 onto substrate 42 which forms on spray-platform 44.

The increased flowability of coated powder 32 may enhance the contact angle, flow through an orifice, and angle of repose characteristics of coated powder 32. Enhancement in these characteristics prevents coated powder 32 from agglomeration during the additive manufacturing process.

Figure 3:
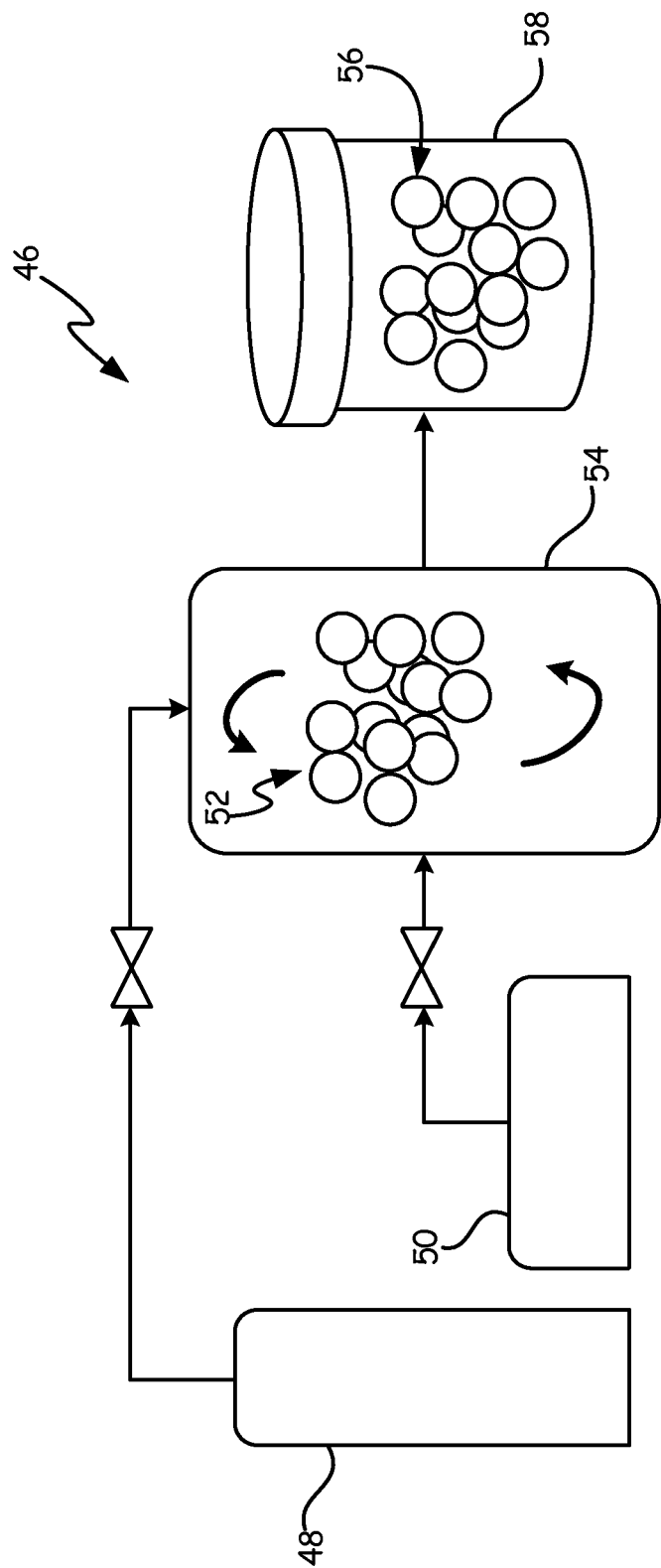
FIG. 3 is a simplified schematic diagram illustrating a powder treatment method according to an alternate embodiment

FIG. 3 shows a simplified schematic diagram of second powder treatment apparatus 46 according to an alternate embodiment of the present disclosure. Second powder treatment apparatus 46 may include gas heater 48, surface treatment reactor 50, fluidized powder 52, second fluidized bed vessel 54, PDMS coated powder 56, and third storage vessel 58.

Gas heater 48 prepares and heats a fluidization gas to be used to fluidize the powder within second fluidized bed vessel 54. Gas heater is fluidly connect to second fluidized bed vessel 54. Surface treatment reactor 50 is also fluidly connected to second fluidized bed vessel 54. Surface treatment reactor 50 provides a surface coating treatment to fluidized powder 52 while fluidized powder 52 is contained in second fluidized bed vessel 54. An example of the coating applied to fluidized powder 52 may include a PDMS coating. After the fluidization and coating steps are complete, PDMS coated powder 56 is then stored in third storage vessel 58 until it is needed for an additive manufacturing process.

Alternatively, the locations of gas heater 48, surface treatment reactor 50, and second fluidized bed vessel 54 can be situated as shown in FIG. 2.

Discussion of Possible Embodiments

The following are non-exclusive descriptions of possible embodiments of the present invention.

A powder treatment method may include loading powder into a fluidized bed vessel. At least some of the powder may be fluidized in the fluidized bed vessel using an inert gas. While fluidized, the powder may be heated in the fluidized bed vessel. A surface treatment coating may be then applied to the powder.

The powder treatment method of the preceding paragraph can optionally include, additionally and/or alternatively, any one or more of the following features, configurations and/or additional components:

the surface treatment coating may comprise a siloxane based coating, a polymethylhydrosiloxane coating and combinations thereof, or a non-silicone based coating, including stearate salts, stearamides, copolymers of ethyl oxide and propylene oxide, and combinations thereof;

the surface treatment coating may comprise a polydimethylsiloxane coating;

the surface treatment coating may be configured to prevent agglomeration of the powder;

the surface treatment coating may be configured to impart hydrophobic properties onto the powder;

heating of the powder may include raising the temperature of the inert gas by an inert gas heater, wherein the inert gas is selected from the group consisting of nitrogen, hydrogen, and argon;

heating of the powder may include raising the temperature of the powder to a temperature below a sintering temperature of the powder;

transferring the powder to a surface treatment unit before applying the surface coating treatment to the powder; and additively manufacturing an article using a surface treatment coated powder.

A powder treatment apparatus includes a fluidized bed vessel. A heat source for introducing heat in to the fluidized bed vessel is included in the powder treatment apparatus. Powder is disposed within the fluidized bed vessel. A surface treatment unit is fluidly connected to the fluidized bed vessel.

The powder treatment apparatus of the preceding paragraph can optionally include, additionally and/or alternatively, any one or more of the following features, configurations and/or additional components:

a storage vessel may be fluidly connected to the surface treatment unit;

the surface treatment unit may be configured to apply a surface treatment coating to a powder;

the fluidized bed vessel may be configured to receive an inert gas; and the inert gas may be selected from the group consisting of nitrogen, hydrogen, and argon.

A powder treatment method may include loading powder into a fluidized bed vessel. At least some of the powder may be fluidized in the fluidized bed vessel using an inert gas. While fluidized, the powder may be heated in the fluidized bed vessel. A surface treatment coating may be applied to the powder. The surface treatment coating may include a siloxane based coating, a polymethylhydrosiloxane coating and combinations thereof, or a non-silicone based coating, including stearate salts, stearamides, copolymers of ethyl oxide and propylene oxide, and combinations thereof. The surface treatment coated powder may be then used to additively manufacture an article.

The powder treatment method of the preceding paragraph can optionally include, additionally and/or alternatively, any one or more of the following features, configurations and/or additional components:

the powder may be selected from the group consisting of metal, ceramic, glass, and polymer powder;

the surface treatment coating may be configured to prevent agglomeration of the powder; and the surface treatment coating may be configured to impart hydrophobic properties onto the powder.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A powder treatment method comprising:
   loading a powder into a fluidized bed vessel;
   fluidizing at least some of the powder in the fluidized bed vessel using a gas;
   heat treating the powder while fluidized in the fluidized bed vessel to remove absorbed and reacted moisture from the powder, and to remove oxides from the powder;
   surface treating the heated treated powder by applying a coating to the powder that imparts hydrophobic, slip, and flow properties to the coated powder; and
   additively manufacturing an article using the coated powder.

2. The method of claim 1, wherein the coating comprises:
   a siloxane based coating that includes polysiloxane, polydimethylsiloxane, polymethylhydrosiloxane or combinations thereof; or a non-silicone based coating that includes stearate salts, stearamides, copolymers of ethyl oxide and propylene oxide, or combinations thereof.

3. The method of claim 2, wherein the coating comprises a polydimethylsiloxane coating.

4. The method of claim 1, wherein the coating prevents agglomeration of the powder.

5. The method of claim 1, wherein heating the powder comprises:
raising the temperature of the gas by a heater, wherein the gas is selected from the group consisting of nitrogen, hydrogen, and argon.

6. The method of claim 1, wherein heat treating the powder comprises:
raising the temperature of the powder to a temperature below a sintering temperature of the powder.

7. The method of claim 6, further comprising:
transferring the powder to a surface treatment unit before applying the coating to the powder.

8. The method of claim 1, wherein the powder comprises aluminum alloy.

9. A powder treatment method comprising:
loading a powder into a fluidized bed vessel;
fluidizing at least some of the powder in the fluidized bed vessel using an inert gas;
heating the powder while fluidized in the fluidized bed vessel moisture and oxides from the powder while the powder is fluidized;
applying a surface treatment coating to the powder, wherein the surface treatment coating includes:
a siloxane based coating that includes polysiloxane, polydimethylsiloxane, polymethylhydrosiloxane or combinations thereof; or
a non-silicone based coating that includes stearate salts, stearamides, copolymers of ethyl oxide and propylene oxide, or combinations thereof; and
additively manufacturing an article using the coated powder.

10. The method of claim 9, wherein the powder is selected from the group consisting of metal, ceramic, glass, and polymer powder.

11. The method of claim 9, wherein the surface treatment coating prevents agglomeration of the powder.

12. The method of claim 9, wherein the surface treatment coating imparts hydrophobic properties onto the powder.

13. The method of claim 10, wherein the powder comprises aluminum alloy.

14. A powder treatment method comprising:
loading a powder into a fluidized bed vessel;
fluidizing at least some of the powder in the fluidized bed vessel using a gas;
heat treating the powder while fluidized in the fluidized bed vessel, by raising the temperature of the powder to a temperature that is below a sintering temperature of the powder and that is high enough to remove absorbed and reacted moisture from the powder;
transferring the powder to a surface treatment unit; and
surface treating the heated treated powder by applying a coating to the powder that imparts hydrophobic, slip, and flow properties to the coated powder.

15. The method of claim 14, wherein the coating comprises:
a siloxane based coating that includes polysiloxane, polydimethylsiloxane, polymethylhydrosiloxane or combinations thereof; or
a non-silicone based coating that includes stearate salts, stearamides, copolymers of ethyl oxide and propylene oxide, or combinations thereof.

16. The method of claim 15, wherein the coating comprises a polydimethylsiloxane coating.

17. The method of claim 14, wherein the coating prevents agglomeration of the powder.

18. The method of claim 14, wherein heat treating the powder comprises:
raising the temperature of the gas by a heater, wherein the gas is selected from the group consisting of nitrogen, hydrogen, and argon.

19. The method of claim 14, wherein the powder is selected from the group consisting of metal, ceramic, glass, and polymer powder.

20. The method of claim 19, wherein the powder comprises aluminum alloy.

* * * * *